June 18, 1940. P. H. BATTEN ET AL 2,204,879
CLUTCH
Filed Feb. 14, 1938 2 Sheets-Sheet 1
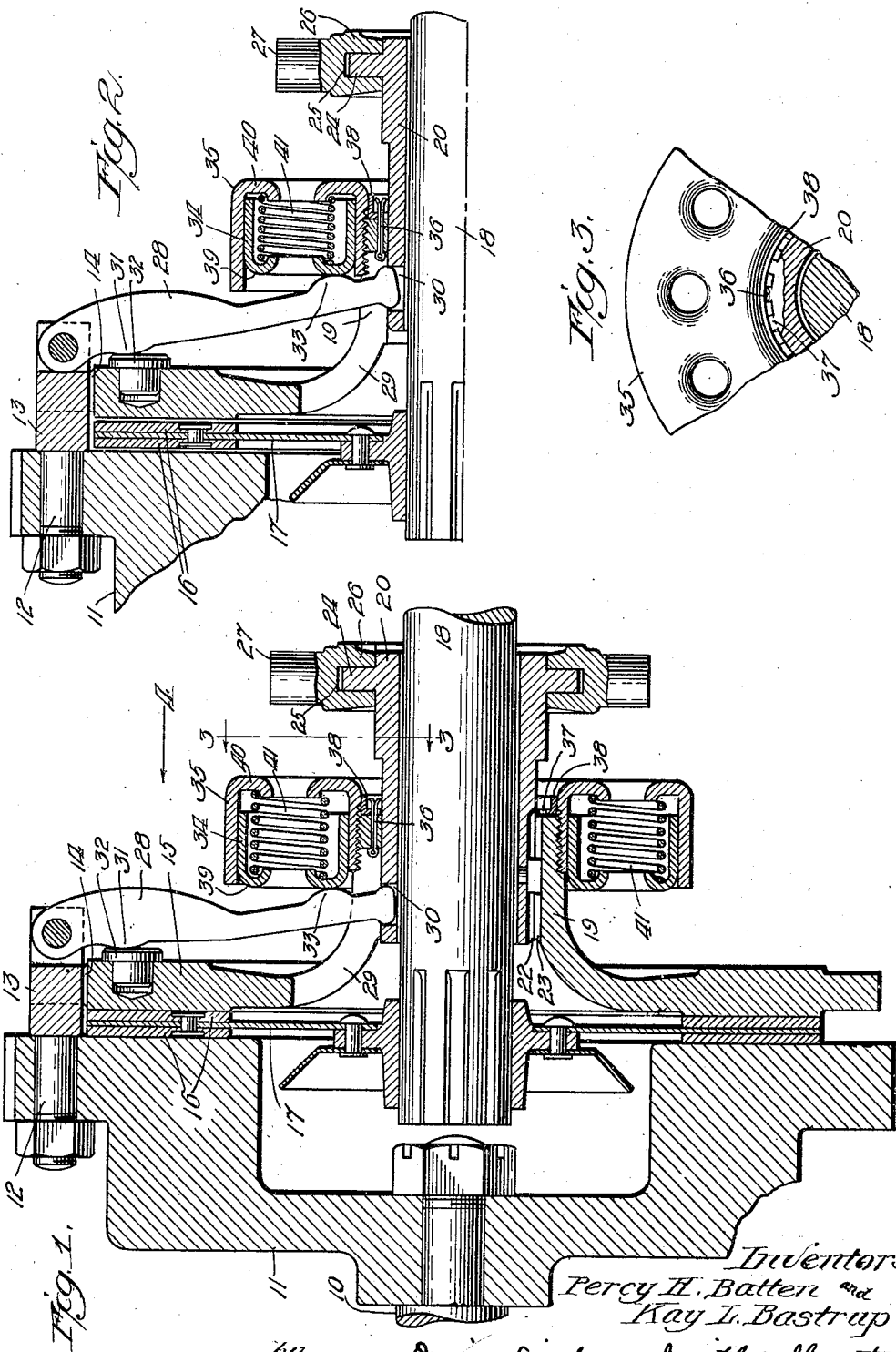
Inventors:
Percy H. Batten and
Kay L. Bastrup
Davis, Lindsey, Smith & Shonts
Attys.

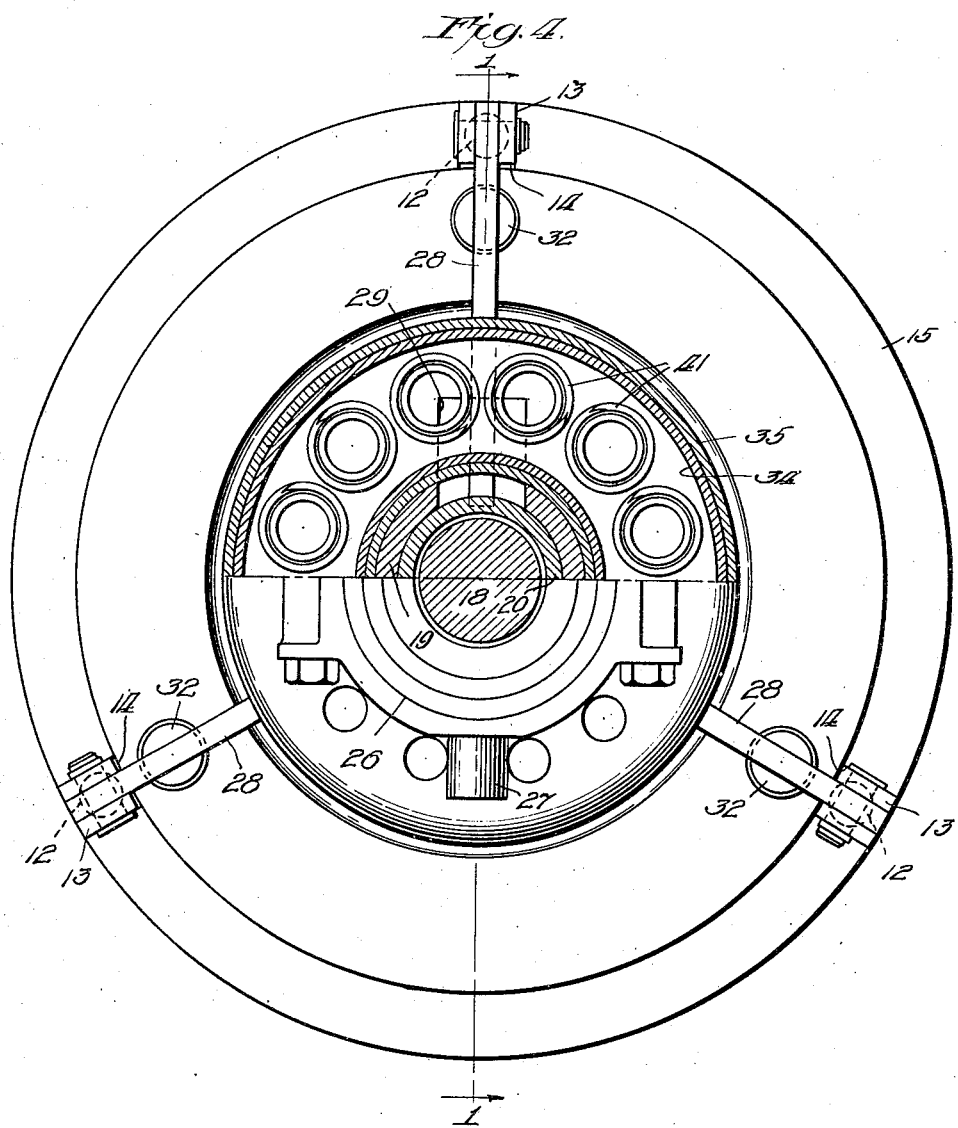

Patented June 18, 1940

2,204,879

UNITED STATES PATENT OFFICE 2,204,879

CLUTCH

Percy H. Batten and Kay L. Bastrup, Racine, Wis., assignors to Twin Disc Clutch Company, Racine, Wis., a corporation of Wisconsin Application February 14, 1938, Serial No. 190,354

7 Claims. (Cl. 192—68)

Our invention relates to clutches of the spring loaded type and is more particularly concerned with a construction in which one of the interconnected rotary elements constitutes one of the clamping members of the clutch.

One object of our invention is to provide a clutch in which the major operative elements, including the movable clamping plate, are supported directly, or indirectly, through the plate, by the devices which drivably connect the plate to a rotary part forming one of the members of the clutch.

A further object is to devise a clutch in which the clamping plate and the associated elements are arranged for easy and rapid attachment to and detachment from a fly-wheel or other rotary part, thus facilitating the repair and replacement of the component elements.

These and further objects of our invention will be set forth in the following specification, reference being had to the accompanying drawings, and the novel means by which said objects are effectuated will be definitely pointed out in the claims.

In the drawings:

Figure 1 is a sectional elevation of our improved clutch, as taken along the line 1—1 in Fig. 4, looking in the direction of the arrows, the clutch being shown in engaged position;

Fig. 2 is a fragmentary, sectional view, similar to that shown in Fig. 1, but showing the clutch in released position;

Fig. 3 is an enlarged section along the line 3—3 in Fig. 1, looking in the direction of the arrows, and showing the device for maintaining in position one of the elements which forms a part of the spring case; and Fig. 4 is an end view of the clutch partly in section, as viewed in the direction of the arrow 4 in Fig. 1.

Referring to Fig. 1 of the drawings, the numeral 10 designates a shaft constituting one of the rotary parts that are interconnected by the clutch structure hereinafter described and which, for purpose of example, may be regarded as a driving shaft, although the conditions of operation may be reversed as to this particular. A flywheel 11 is secured to the shaft and carries in circumferentially spaced relation adjacent its periphery a plurality of driving pins 12, three such pins being shown in the present arrangement. The end of each pin extends beyond the right face of the flywheel, as viewed in Fig. 1, and is squared as at 13 for driving connection with a slot 14 cut inwardly from the edge face of a shiftable clamping plate 15. These pins not only serve as a driving connection, but additionally support the plate on the flywheel.

The opposed faces of the flywheel and plate are intended to frictionally engage facings 16 of suitable material which are secured to opposite sides of a friction disc 17 that is drivably connected to a driven shaft 18 so that it is free to assume positions between the plate and the flywheel.

The plate 15 is provided with an integral, tubular extension 19 that is bored to supportably receive an operating sleeve 20 in coaxial relation to the shaft 18. The left end of this sleeve is held against rotation relative to the extension 19 by a pin 21 that is mounted in the sleeve and has a head which fits into registering keyways 22 and 23 provided, respectively, in the sleeve 20 and extension 19. Accordingly, the sleeve partakes of the rotary movement of the clamping plate, but is adapted to move in axial directions relative thereto. Endwise movement of the sleeve is effected by an annular flange 24 provided on the sleeve which fits within an annular groove 25 formed in an operating collar 26. This collar carries a pair of trunnions that may be engaged by a suitable shifting device (not shown), such as the usual fork.

The operating mechanism for the clutch comprises a plurality of levers 28, each of which has its outer end pivotally mounted between the arms of the bifurcated end of a driving pin 12. From this pivotal point, each lever extends toward the shaft 18 in relatively close relation to the adjacent face of the clamping plate through a clearance opening 29 provided in the extension 19 and its inner end is received within a slot 30 provided in the sleeve 20, thus providing an operative connection between the lever and the sleeve.

The left edge face of the lever is provided with a boss 31 which is intended to abut against a pin 32 that is mounted in the plate, so that, when the lever is moved in a clockwise direction, as hereinafter described, the clamping plate 15 will be shifted to driving position.

Adjacent the inner end of each lever, the right edge face thereof is formed with a boss 33 which abuts against the adjacent end wall of an inner sleeve 34 which is mounted in telescopic relation to an outer sleeve 35 that is threaded on the extension 19. As clearly indicated in Fig. 1, the sleeves 34 and 35 are concentric with the axis of the shaft 18 and inadvertent rotary shifting of the sleeve 35 may be prevented by a cotter pin 36 that is mounted on the extension 19 and which engages with any one of a number of slots 37 carried by an annular ring 38 that is fast on the inner peripheral surface of the sleeve 35.

The opposed end walls of the sleeves 34 and 35 are provided with a plurality of circumferentially spaced, ring-shaped pockets 39 and 40, respectively, which are arranged in cooperative pairs and each pair of which acts as abutments for the ends of a helical spring 41. These springs provide the required spring loading for the clutch and it will be obvious that their tendency to extend between the fixed abutment provided by the end wall of the sleeve 35 and the shiftable end wall of the sleeve 34 always maintains the latter sleeve in contact with the lever bosses 33 and, hence, provides the required application of pressure to the clamping plate 15. As already indicated, the clutch is shown in engaged position in Fig. 1 of the drawings and, within the permissible wear of the friction facings 16, the springs 41 will always exert pressure against the clamping plate 15.

To disengage the clutch, the operating sleeve 20 is moved toward the right from the position illustrated in Fig. 1, thus withdrawing the lever 28 against the compression of the loading spring 41 and positively retracting the plate 15 by the pressure exerted by the lever against the sleeve 35 through the spring 41. To engage the clutch, it is merely necessary to move the operating sleeve 20 toward the left, whereupon the extension of the spring 41 shifts the operating lever 28 to driving position.

The disposition of the loading springs around the tubular extension 19 provides for a highly effective and uniform application of pressure to the clutch levers and also enables these springs to be carried by the clamping plate, thus providing for a certain simplification in design and ease with which this clutch construction may be applied to a rotary element, such as a flywheel. It will be understood, however, that the flywheel which is illustrated as constituting one of the clamping members of the clutch is generally indicative of any part that may be used for this purpose and may, for example, be formed simply as an ordinary plate or disc.

We claim:

1. In a clutch, the combination with a drivably connected clamping member and shiftable clamping plate adapted to grip a friction disc therebetween, of a plurality of operating levers pivotally connected to the member, an outer sleeve carried by an extension provided on the plate, the sleeve and extension being coaxial with the axis of the clutch, an inner sleeve telescopically mounted in the outer sleeve and adapted to contact the levers, the opposed end walls of the sleeves being provided with a plurality of circumferentially spaced pockets arranged in cooperative pairs, and a helical spring extending between each pair of pockets and acting to press the levers against the plate and shift the same to clamping position.

2. In a clutch, the combination of a clamping plate, pin means adapted for mounting in a rotary part constituting one of the members of the clutch and having driving connection with the plate, an operating lever pivoted on the pin means, a fixed abutment and a movable abutment carried by the plate, the movable abutment being adapted to contact the lever, and spring means disposed between the abutments and acting to press the lever against the plate and shift the same to clamping position.

3. In a clutch, the combination of a clamping plate, pin means adapted for mounting in a rotary part constituting one of the members of the clutch and having driving connection with the plate, an operating lever pivoted on the pin means, a fixed abutment and a movable abutment carried by the plate in telescopic relation, the movable abutment being adapted to contact the lever, and spring means interposed between the abutments and acting to press the lever against the plate and shift the same to clamping position.

4. In a clutch, the combination of a clamping plate, pin means adapted for mounting in a rotary part constituting one of the members of the clutch and having driving connection with the plate, an operating lever pivoted on the pin means, an outer sleeve carried by an extension provided on the plate, the sleeve and extension being coaxial with the axis of the clutch, an inner sleeve telescopically mounted in the outer sleeve and adapted to contact the lever, and spring means disposed between the opposed end walls of the sleeves and acting through the inner sleeve to press the lever against the plate and shift the same to clamping position.

5. In a clutch, the combination of a clamping plate, pin means adapted for mounting in a rotary part constituting one of the members of the clutch and having driving connection with the plate, an operating lever pivoted on the pin means, an extension coaxial with the axis of the clutch provided on the plate, fixed and movable abutments carried by the extension, the movable abutment being adapted to contact the lever, spring means extending between the abutments and acting to press the lever against the plate and shift the same to clamping position, and means carried by the extension for retracting the lever against the pressure of the spring means to release the plate.

6. In a clutch, the combination of a clamping plate, pin means adapted for mounting in a rotary part constituting one of the members of the clutch and having driving connection with the plate, an operating lever pivoted on the pin means and extending inwardly toward the axis of the clutch relatively close to and adapted to bear against the outer face of the plate, an extension coaxial with the axis of the clutch provided on the plate, fixed and movable abutments carried by the extension, the movable abutment being adapted to contact the lever, spring means interposed between the abutments and acting to press the lever against the plate and shift the same to clamping position, and a sleeve slidable in the extension and having a slot for receiving the free end of the lever to thereby retract the same against the pressure of the spring means to release the plate.

7. In a clutch, the combination of a clamping plate, pin means adapted for mounting in a rotary part constituting one of the members of the clutch and having driving connection with the plate, an operating lever pivoted at one end on the pin means and extending toward the clutch axis in proximity to the plate, spring means carried by the plate and acting to press the lever against the plate and shift the same to clamping position, the lever bearing against the plate adjacent its pivoted end and the spring means bearing against the lever adjacent its opposite end, and means carried by the plate engageable with said opposite lever end to retract the lever against the pressure of the spring means to release the plate whereby the forces actuating the lever to working and release positions operate at the maximum distance from the lever pivot.

PERCY H. BATTEN.
KAY L. BASTRUP.